United States Patent [19]

Willard et al.

[11] Patent Number: 4,879,126

[45] Date of Patent: Nov. 7, 1989

[54] METHOD FOR PREVENTING DISTORTION IN THE SHAPE OF FRIED STRAND-LIKE EXPANDED SNACKS

[76] Inventors: Miles J. Willard, P.O. Box 1747; Jane J. Arnold, 1120 Orlin; Veldon M. Hix, Rte. #6, Box 263, all of Idaho Falls, Id. 83401

[21] Appl. No.: 806,128

[22] Filed: Dec. 9, 1985

Related U.S. Application Data

[63] Continuation of Ser. No. 732,908, May 9, 1985, abandoned, which is a continuation of Ser. No. 631,509, Jul. 16, 1984, abandoned, which is a continuation of Ser. No. 384,896, Jun. 4, 1982, abandoned.

[51] Int. Cl.$^4$ ............. A21D 2/36; A23L 1/217; A23P 1/14
[52] U.S. Cl. ................. 426/272; 426/440; 426/500; 426/503; 426/549; 426/550; 426/559; 426/560; 426/807
[58] Field of Search .............. 426/104, 272, 549, 550, 426/559, 622, 625, 637, 653, 661, 440, 446, 450, 496, 500, 503, 517, 452, 560, 808

[56] References Cited

U.S. PATENT DOCUMENTS

| | | | |
|---|---|---|---|
| 1,382,926 | 6/1921 | Mitchell | 426/500 X |
| 2,463,112 | 3/1949 | Kipnis | 426/500 X |
| 2,615,809 | 10/1952 | Jean | 426/440 |
| 3,190,755 | 6/1965 | Peden | 426/559 X |
| 3,499,766 | 3/1970 | Vollink et al. | 426/559 |
| 3,851,084 | 11/1974 | Rossen et al. | 426/440 X |
| 4,244,974 | 1/1981 | Minami et al. | 426/272 X |
| 4,297,375 | 10/1981 | Nelson et al. | 426/808 X |

*Primary Examiner*—Arthur L. Corbin
*Attorney, Agent, or Firm*—Hopkins, French, Crockett, Springer & Hoopes

[57] ABSTRACT

A deep-fat fried expanded snack product is made from a moist dough according to a technique which prevents undue distortion of the snack during frying. The dough can include cooked potato solids, masa, and/or one or more cereal flours, with a moisture content of about 35% to 60% at the time of frying. An amount of ungelatinized starch can be present in the dough when fried. In one embodiment, the dough is extruded as a pair of separate long, thin strands which are formed into a composite dough piece by adhering the strands by surface contact along the long dimension of the strands. The two adherent strands can be straight solid dough pieces in side-by-side contact, or the strands can be twisted together to form a braid. In another embodiment, a sheeted dough piece can be slit lengthwise along its center and partially through the depth of the dough piece to form the equivalent of a pair of adhering strands. The composite dough piece is immediately fried following the forming step, producing an expanded finished snack that is essentially straight with a shape virtually free of distortion. The strands in the composite dough piece, when fried, also expand more than if each strand is fried singly.

32 Claims, 1 Drawing Sheet

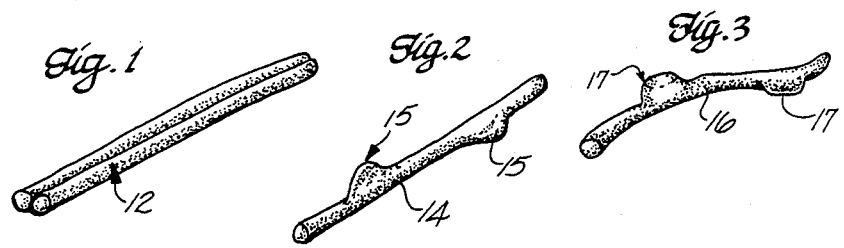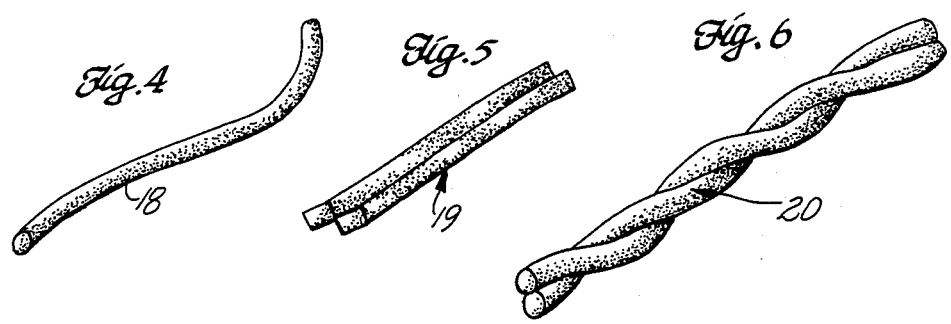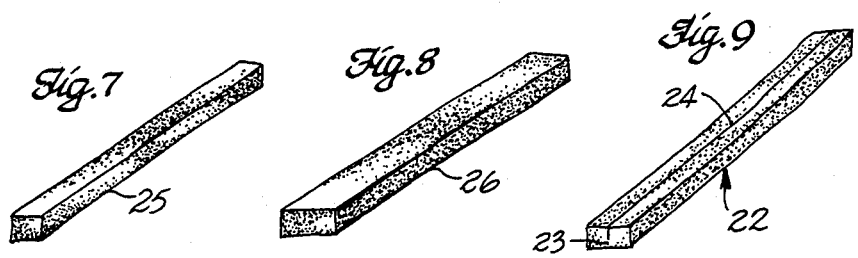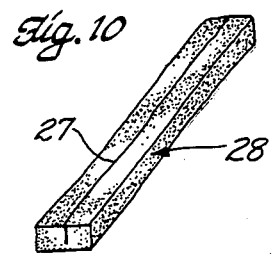

METHOD FOR PREVENTING DISTORTION IN THE SHAPE OF FRIED STRAND-LIKE EXPANDED SNACKS

CROSS-REFERENCE TO RELATED APPLICATION

This is a continuation of application Ser. No. 732,908 filed May 9, 1985, now abandoned, which is a continuation of application Ser. No. 631,509 filed July 16, 1984, now abandoned, which is a continuation of application Ser. No. 384,896 filed June 4, 1982, now abandoned.

BACKGROUND OF THE INVENTION

1. Field of the Invention

This invention relates to a deep fat fried expanded snack made from a moist dough formed into at least two relatively thin strands and arranged so that the strands are in contact along the long dimension of the snack during frying. This permits expansion of the snack during frying without distorting the shape of the snack.

2. Description of the Prior Art

Many well known shelf-stable snack foods are produced by frying thin pieces of raw vegetables such as potatoes, or by frying shaped pieces of a potato-based or cereal-based dough to a moisture content of about 2%. Raw potatoes are cut into thin slices or narrow sticks known as shoestrings, washed to remove surface starch, and fried for about two to four minutes to produce the familiar potato chip or shoestring potato snacks.

Partially cooked, soaked kernels of corn are ground to form a dough which is forced by hydraulic pressure through a series of narrow openings, and then cut to convenient lengths and fried to form corn chips, as described in Doolin U.S. Pat. No. 2,002,053 and Brown U.S. Pat. No. 3,278,311, et al. Alternately, the ground corn is sheeted between rollers, cut into pieces, baked to reduce the moisture content, and fried, as described in Anderson U.S. Pat. No. 2,905,559, et al.

Potato based doughs used for making snack products by similar methods include methods for making fabricated potato chips described in Succo U.S. Pat. No. 3,519,432, et al, and Liepa U.S. Pat. No. 3,608,474. Willard U.S. Pat. Nos. 3,997,684 and 3,886,291 describe a process in which a dough is formed from cooked potato solids and a raw starch. The dough can be extruded or sheeted and directly fried. The composition of the dough is adjusted so that the extruded products expand during frying from about 1.6 to 3.0 times the extruder die opening. The sheeted products expand during frying from about 1.6 to 4.5 times the opening between the sheeter rolls.

As for the dimensions of the fried products produced from these processes, the finished snack is relatively wide compared to its thickness. For example, conventional corn chips can be extruded through a die slot having a thickness of about 0.050 inch and a width of about 0.50 in. to 1.25 inch. Potato rings can be extruded through a die with a 0.045 inch opening measured radially with an outer diameter of 0.625 inch, i.e., a circumference of about 2.0 inches.

Fried snack products formed as an elongated strand are particularly desirable to consumers. Shoestring potatoes can be conveniently formed from raw potatoes; and since the internal cell structure of the raw potato is maintained throughout frying, the product does not distort or curl during frying. Pretzel dough is extruded as a round, thin strand and then baked on a supporting oven conveyer to produce pretzel sticks, which do not distort or curl during baking. However, attempts to produce an elongated strand-like fried snack from a moist dough have generally not been successful, insofar as avoiding undesired distortion during frying is concerned. Because of the relative narrow cross-sectional dimensions of strands compared to their length, the products tend to curve or curl and tangle together, resulting in unattractive random shapes when they are removed from the hot frying fat. Another problem we have discovered is that narrow, elongated strands made from many dough compositions tend to form irregular protuberances during frying due to the internal pressure generated by escaping steam at frying temperatures. It appears that the outer surfaces of the fried strands become impervious to the escape of steam during the initial moments of frying. Later, as heat is transferred to the interior portion of the strand, the increased vapor pressure of the remaining water creates intense internal pressure. This causes the side walls of the strand to bulge and deform and, in some cases, to crack open or explode. We have noted that this condition is particularly prevalent when the ingredients of the dough contain a significant quantity of an ungelatinized or raw starch. Similar ingredients that exhibit a rapid increase in viscosity upon heating in the presence of water also can create explosions in the fryer.

In British patent No. 1,109,930 to Southern, round "straws" are produced from a fresh potato dough by extruding the dough vertically through a horizontal die plate with 0.125 inch diameter holes. These straws are cut into 2-inch lengths and fried from four to five minutes at a temperature of 300°–350° F. without any appreciable increase in diameter taking place during frying. Care is taken during extrusion that the straws do not touch or stick together. The straws curl excessively upon frying. The finished product contains about 50% fat, requiring centrifuging to reduce the fat content to a more desirable 30%.

In British patent No. 1,187,762 to Bolton et al, 5 mm. square sticks are extruded from a dough comprising cooked potato solids, a starch and a filler. The potato sticks are fried eleven minutes at an undisclosed temperature. The fried products require centrifuging to reduce the fat content from 45% to about 25%. We have found that the dough sticks formed by the mixtures described in this patent create dangerous explosions during deep fat frying.

M. F. Peden, Jr. U.S. Pat. No. 3,190,755 describes a process for making a strand-like snack product in which a cooked dough is extruded to form one-eighth inch diameter strands. These strands are case-hardened and rolled flat, causing the hardened outer surface to shatter. The strands are then dried to reduce their moisture content to about 10% before frying to produce an expanded product with a rippled surface upon frying.

Dexter U.S. Pat. No. 3,966,983, et al. describes a frying process to eliminate distortion of thin formed pieces of dough such as simulated shoestring potatoes. The thin dough pieces are pre-cooked with heated oil while the dough pieces are supported on a screen-like conveyor. The pieces are then fried conventionally after they have stiffened from the oil treatment. The pieces so treated are relatively thin and flat, having been cut from a rolled dough sheet. While the treatment is said to reduce the amount of distortion during frying, the equipment is complex and expensive, and the spraying of hot frying oil can cause rapid buildup of free fatty acids.

Elongated, square-sided potato products have been made from doughs consisting essentially of rehydrated dried potatoes to form fabricated French fried potatoes, for example. Processes for making the dough for such products are described in Fritzberg U.S. Pat. No. 3,282,704; Willard U.S. Pat. No. 3,399,062, et al.; Citti U.S. Pat. No. 4,198,437, et al.; and Shatila U.S. Pat. No. 3,968,265. Apparatus for producing French fries is described in Shatila U.S. Pat. No. 4,056,345, et al and Ilines U.S. Pat. No. 3,645,748. The dough compositions used in these processes generally contain a higher level of water than the processes for making the snack products of this invention. In French fry processing, frying is continued only long enough to form a crisp brown skin on the surface of the finished product, whereas in producing the fried snacks of this invention water removal is nearly complete.

Thus, it is desirable to produce a strand-like expanded fried snack by frying a moist dough, without intermediate treatment following forming of the dough piece, so that the shape of the snack des not distort during frying. Undesired distortion includes curling of the strand-like product, formation of undesired protuberances on the finished product, explosion of the product in the fryer, or agglomeration of the fried dough pieces in the fryer.

SUMMARY OF THE INVENTION

Briefly, this invention provides a method for preventing distortion in the shape of fried strand-like snack products made from a dough containing cooked potato solids, ground precooked lime-treated corn, or flours made from precooked or raw corn, or other cereal flours or mixtures of cereal flours. The dough also can include other snack food ingredients known to enhance the expansion and formation of desirable textures in snack products. Raw or ungelatinized flours, pregelatinized flours and starches are examples. The dough also can contain extrusion aids such as oil, lecithin or monoglyceride emulsifiers, and flavoring ingredients or agents. Sufficient water is added to prepare a dough of proper consistency based on the overall water absorption of the combined snack ingredients. The dough is formed into at least two strands which are in contact substantially along the entire long dimension of the strands. Such contact is maintained after forming and during frying of the strands. The strands being in contact with each other prevent distorted shapes that would otherwise occur if the same dough in the same strand form is fried singly. The result is a non-distorted, essentially straight, elongated snack product in which each strand of the finished product has expanded about 1.1 to about 1.5 its original cross-sectional dimension during frying. Each strand of the finished product can expand from about 2.5% to about 20% more than the same strand fried singly. In addition, the method can avoid intermediate treatment such as preliminary drying by hot air or hot oil sprays.

These and other aspects of the invention will be more fully understood by referring to the following detailed description and the accompanying drawings.

DRAWINGS

FIG. 1 is a semi-schematic perspective view illustrating a fried snack formed as two adhering strands according to principles of this invention;

FIG. 2 is a semi-schematic perspective view illustrating a fried snack formed as a single thin strand in which a number of protuberances have formed during frying;

FIG. 3 is a semi-schematic perspective view illustrating a fried snack formed as a single thin strand which has exploded during frying;

FIG. 4 is a semi-schematic perspective view illustrating a fried snack formed as a single strand which has curved during frying;

FIG. 5 is a semi-schematic perspective view illustrating a fried snack formed as a double strand made from two square extrusions joined along one of the edges of each strand;

FIG. 6 is a semi-schematic perspective view illustrating a fried snack formed as a pair of twisted strands according to principles of this invention;

FIG. 7 is a semi-schematic perspective view illustrating a fried snack formed as a sheeted square strand-like product;

FIG. 8 is a semi-schemaic perspective view illustrating a fried snack formed as a rectangular sheeted strand-like product;

FIG. 9 is a semi-schematic perspective view illustrating a fried snack formed as a long, thin piece with a knife cut along the long dimension of the piece for simulating a pair of longitudinally adhering strands; and FIG. 10 is a semi-schematic perspective view illustrating a fried snack formed as a long, thin piece with a center knife cut extending almost totally through the piece for simulating a pair of adhering strands.

DETAILED DESCRIPTION

This invention can be applied to various combinations of snack ingredients which, when formed into a dough of sufficient moisture content, can be formed into thin strands. The strands are then fried to form a crisp, expanded, relatively low fat content snack product with a desirable flavor and texture. FIG. 1 illustrates an essentially straight composite strand-shaped fried expanded snack 12 formed from two adherent strands of dough according to principles of this invention. The invention can be applied to dough compositions containing potato or cereal grain solids such as cooked potato solids, ground precooked lime-treated corn, known as masa, or cereal flours. Examples are dehydrated potatoes (flakes, granules or potato flour), mashed potatoes, or flours made from corn, rice, barley, bulgur, oats, rye or soy. The corn flour can be made from precooked or raw corn or combinations of both. Generally, the solids are mixed with water to form a dough which is formed into the desired composite shape and then immediately fried in hot cooking oil to form the finished fried snack.

The dough, at the time of frying, can contain a quantity of raw ungelatinized starch either as a separate ingredient, or as a portion of one of the components. For example, ground corn dough prepared by conventional cooking and lime treatment of raw corn kernels contains a portion of a still ungelatinized raw starch from the center of the corn kernels. This raw starch is distributed throughout the corn-based dough (also known as masa) during grinding. Dough compositions containing dehydrated potatoes or cereal flours can include an ungelatinized starch-containing ingredient or a raw starch. Examples of raw starches are potato, corn, tapioca or amioca starch. Raw starches and ungelatinized starch-containing ingredients do not absorb water, and therefore inclusion in the dough formula reduces the overall cohesiveness of the dough and facilitates extrusion and forming at relatively low pressures. When a thin strand of this dough is fried in hot fat, there is an instantaneous transfer of heat to the entire circumference of the strand. A surface structure is formed quickly as a continuous sheath around the strand by a combination of rapid removal of water from the surface and immediate gelatinization of any portion of the dough that absorbs moisture quickly upon heating above the normal starch gelatinization temperature (about 70° C.).

The surfaces of thin, flat dough pieces (i.e., dough pieces which are substantially wider than their thickness) normally expand apart during frying in hot cooking oil, while maintaining a continuous expanded snack structure that provides a desirable structure. No such expansion is possible when frying a moist dough piece formed as a solid single strand of reasonably uniform cross section (such as circular or square). Since the exterior surface is firmed around the entire periphery of the strand of dough during frying, further expansion is limited, causing a rapid buildup of internal pressure from evaporation of the residual water within the strand. With relatively thin strands containing a low level of water (say, below about 30 to 35% moisture (based on the total weight of the dough), the pressure may be relieved during frying by forming cracks along the long axis of the strand. Normally, however, the side wall of the single strand will bulge outward, forming a number of protuberances that destroy the appearance of the finished product which desirably has a uniformly straight shape. FIG. 2 illustrates a finished fried snack 14 formed as a solid single strand and having undesired protuberances 15 upon frying.

In the case of products containing a higher level of water (say from about 40% to about 60% moisture, based on the total weight of the dough), a more impervious outer sheath is formed upon frying. In this instance, the build up of pressure can cause the sheath to burst violently, creating a substantial hazard for persons in the vicinity, as well as complete destruction of the intended snack shape. FIG. 3 illustrates a fried snack 16 which has exploded in this manner, forming crater-like open cells 17 in its outer surface.

These problems with frying a single strand of dough are most prevalent when the dough contains ungelatinized starch, either as a raw starch and/or as an ingredient containing ungelatinized starch. For instance, when cooked potato solids are the principal ingredient in the dough, single dough strands distort upon frying when the dough also contains added raw starch. Potato ingredients such as flakes or granules, when processed, are completely cooked, and therefore the starch in them is completely gelatinized. When raw starch is left out of the potato-based dough, single strand-shaped dough pieces do not develop a case-hardened sheath in the fryer. The fried strands are very soft, greasy, and blistered, although they do not have protuberances.

When corn solids are the principal ingredient in the dough, single dough strands distort even if the dough does not contain added raw starch. For example, even the most highly "gelatinized" corn ingredients show an increase in viscosity when heated above the gelatinization temperature of corn starch, illustrating that the corn-based ingredients still contain residual starch molecules that have not been completely gelatinized during the pregelatinizing process. As a result, when a dough composition containing the corn-based ingredients, with no added raw starch, is formed as a solid strand and fried, undesired protuberances are formed.

Dough pieces formed as single strands also tend to curl and tangle together when dropped into the frying oil. Such curling and tangling is caused from the motion of the oil, the ebullition of steam, the frier paddles, contact with other pieces, and the aforementioned buildup of internal pressure which tends to make the single strands curl. FIG. 4 illustrates such a curled fried snack 18. Thus, the frying of single strands of dough which contain potato solids or cereal-based ingredients combined with sufficient water to produce an otherwise desirable expanded fried snack product instead results in a tangled mass of intertwined clumped strands often resembling a bird's nest. Attempts to maintain the strands in a straight configuration by pre-spraying with hot fat, or physically holding them aligned have been commercially unsuccessful.

We have discovered that the problems of undesired distortion and agglomeration of strand-shaped dough pieces are virtually eliminated by forming the dough as a composite multi-strand product similar to that illustrated in FIG. 1. If two (or more) strands of dough are adjacent to each other during forming so that the strands adhere to one another and are maintained in surface contact along their long dimensions when fried, the result is a unitary finished fried snack in which the two strands having individually maintained their separate strand-like shape while becoming integral with one another along the point of adherence. During frying, the outer surface of the rapidly firming snack structure is allowed to expand sufficiently to relieve the internal pressure, while eliminating the tendency to deform or explode during the escape of water from the interior of the dough piece. Not only is the finished piece not distorted, but the overall expansion of each strand is greater than the expansion of the same strand fried singly. It was entirely unexpected that the problems encountered when frying single strands of dough could be solved by adhering the surfaces of two adjacent strands, where such point contact is between such a small percentage of the surface areas of the two strands. It was also unexpected that greater expansion upon frying would result from two adhering strands when compared with the expansion of a single strand.

As a further benefit, the adherence of two adjacent strands strengthens the overall structure of the composite snack, preventing excessive curling or distortion while frying, and thus eliminating clumping together and the need for pretreatment to stiffen the outer surfaces.

The strands can be formed by any means consistent with the characteristics of the dough and the desired shape of the finished product. For example, two die openings can be situated in a single extrusion die so that the emerging strands can be urged into surface contact with each other along the entire length of the extruded strands. Dough pieces are subsequently cut to the desired length and fried. The fried snack 12 illustrated in FIG. 1 is formed by two solid, straight strands of dough which are round in cross section. In a particularly desirable form of this invention, the strands can be twisted together as they emerge from the two die nozzles to ensure that they contact one another along their entire length, forming what is referred to herein as a braided product 20 illustrated in FIG. 6.

As an alternate to extrusion, the dough can be sheeted to the same outer dimension as the extruded strands.

The dough sheet is then slit longitudinally by a rotating series of knives (not shown) to form an elongated divided piece 22 shown in FIG. 9. A thin web 23 of material is left below the longitudinal knife cut 24, between the two adjacent strands shown in FIG. 9. The depth of the knife cut 24 can be controlled to retain the strands adjacent one another during cutting and frying. This composite dough piece eliminates uncontrolled distortion or explosion during frying in much the same manner as the adherent dough strands of FIGS. 1 and 6.

The techniques of this invention are applicable for making fried snacks from a dough having a moisture content in the range from about 35% to about 60%, by weight of the dough. The dough pieces are fried using conventional equipment known in the snack food industry. Frying temperature is about 350° F., with frying time ranging from two to four minutes for reducing the moisture content of the fried snack to about 2% or less by weight. Normally the fat content of the finished fried product will be in the range of 20% to 35%, preferably between 25% and 30%. In no case is centrifuging or any method for removing excess fat required.

The shapes may be square, round or elliptical in cross section. The dimension of individual strands can be expressed by the ratio of the major and minor diameters. A round strand is one with a 1:1 ratio, as would be a squareshaped product. For the purpose of this invention, a single strand is defined as any extruded piece with a cross section in which the ratio of the major to minor diameter is 2:1, or less.

Larger diameter strands can be produced if a center post is inserted into each die to produce a hollowed center in each extruded dough piece. Such products can be fried in a shorter time than a solid piece, since less internal water diffuses through the surfaces of the piece. Strandshaped products with hollowed centers do not deform or explode to the same extent as do solid extrusions. The expansion of individual strands formed with an internal void is less than for double strand products, since there is less internal pressure to expand the structure of the fried piece.

The following examples illustrate formation of various strand-like fried snack products from a number of conventional and novel food ingredients.

EXAMPLE 1

A dry mixture was prepared from the following ingredients:

| | |
|---|---|
| Potato flakes | 120 gm |
| Potato granules | 45 gm |
| Potato starch | 132 gm |
| Salt | 9 gm |

300 gm of this mixture was mixed with 300 gm of water at 20° C. in a Hobart N-50 mixer, using the flat paddle turning at speed No. 1 for five minutes. The friable dough was placed into a two-inch i.d. laboratory extruder fitted with a piston actuated manually by a threaded plunger. Various interchangeable dies were used to measure the effect of shape on product quality. In this experiment, the following dies were used:

A. A cylindrical ring-shaped die, 0.625 inch o.d., 0.045 inch opening, forming rings with a product length of 0.5 inch.

B. A square die with 5 mm sides, forming straight, solid single strands with a product length of 2 inches.

C. A round die with 0.14 inch (3.56 mm) diameter, forming straight, solid single strands with product length of 2 inches.

The extruded single rings of Sample A and strands of Samples B and C were fried in hot cooking oil at 350° F. in a laboratory batch fryer, producing fried snacks with a moisture content below 2.0%. In addition, straight single strands extruded as solid strands in Samples B and C were collected on a tray and made into double strands by gently pressing two adjacent single strands together so that both strands were in surface contact along their entire length. The results are summarized in the following table, in which the shapes of the fried snacks were judged, and the percentage of fried snacks of each shape was determined. Expansion ratio was measured as the ratio of the thickness of the fried piece to the thickness of the dough piece before frying.

| Shape | SAMPLE A Cyl. Ring | SAMPLE B Square Strand | | SAMPLE C Round Strand | |
|---|---|---|---|---|---|
| | | Sgl. | Dbl. | Sgl. | Dbl. |
| Orig. thickness (mm) | 1.16 | 6.35 | 6.35 | 3.57 | 3.56 |
| Thickness after frying | 2.37 | 7.33 | 7.70 | 4.79 | 5.44 |
| Expansion ratio | 2.04 | 1.15 | 1.21 | 1.34 | 1.52 |
| Increase in exp. (%) | — | — | 5.20 | — | 13.40 |
| Shape | | | | | |
| Good (%) | 100 | 0[a] | 100 | 0 | 100 |
| Distorted (%) | 0 | 100[b] | 0 | 100 | 0 |
| Curved (%) | — | 78 | 0 | 100 | 53 |

[a] = Exploded violently
[b] Distorted, with many protuberances or split sides

The results showed conclusively that a dough that produces a ring-shaped fried potato snack of good quality cannot also be used to produce solid single strand-shaped fried snacks under the same frying conditions, unless two adjacent strands are in contact substantially along the entire length of the snack. It was also noted that straight solid strands fried while in contact with each other expanded more (approximately 15% more) than portions of the single strands that had not otherwise deformed or exploded during frying. It was also noted that a few samples of double strands had not been sticky enough to adhere along their entire length, and that the portions of the double strands that did adhere were not deformed, whereas the portions that separated became deformed in a manner similar to the strands that had been fried singly. It was further noted that the double strands remained straighter during frying and did not clump together as did the single strands.

EXAMPLE 2

In a laboratory preparation of a sheeted fried corn snack, dry ingredients were blended in the following proportions:

| | |
|---|---|
| Whole Non-limed Corn Flour | 47.9% |
| Pregelatinized Corn Flour | 18.4% |
| Cracked Wheat | 10.0% |
| Amioca Starch | 15.3% |
| Corn Starch | 8.5% |
| Salt | 1.0% |

300 gm of this dry mix were combined and mixed with 200 gm of water in the Hobart N-50 mixer for three minutes at speed No. 1, using a dough hook. The dough was sheeted in a Rondo Model 1-500 series sheeter, using five successive passes of decreasing aperture to a final dough thickness of 0.125 inch. The dough sheet was then cut into the following shapes:

A. Straight, solid, narrow strands of square cross section (i.e., 0.125×0.124 inch), as illustrated by the snack 25 shown in FIG. 7.

B. Straight, solid, rectangular strands approximately ¼-inch wide, as illustrated by the snack 26 shown in FIG. 8.

C. Straight, solid, rectangular strands ¼-inch wide, with a dividing cut made centrally along the axis to a depth of approximately one half the thickness of the dough piece, as illustrated by the snack 22 shown in FIG. 9.

D. The same as Sample C, except that the center cut extended as deep as possible without subdividing the pieces into two individual strands, as illustrated by the center cut 27 of the snack 28 shown in FIG. 10.

All products were fried in hot cooking oil at 350° F. to a final moisture content of below 2%. The results of the tests are summarized in the table below.

|  | SAMPLE A FIG. 7 | SAMPLE B FIG. 8 | SAMPLE C FIG. 9 | SAMPLE D FIG. 10 |
|---|---|---|---|---|
| Good (%) | 0 | 0 | 82.70 | 100 |
| Distorted (%) | 100 | 100 | 17.30 | 0 |
| Expansion Ratio | 1.37 | 1.40 | 1.51 | 1.51 |
| Increase in exp. (%) | — | — | 9.30 | 9.30 |

Samples C and D demonstrate that the double strand products again prevented severe distortion or exploding when compared with single strand products. In addition, this example shows that the same distortion problem exists and the same solution is provided according to the practice of this invention, independently of whether the snacks are formed by extrusion or sheeting techniques.

Using the technique demonstrated for Sample D, a novel five-strand product (not shown) was made by cutting serrations in a one-inch wide dough strip of the same 0.125 inch thick dough, resulting in a novel undistorted fried snack product resembling a corrugated corn chip.

EXAMPLE 3

A commercially available masa flour known as Valley Grain No. 7 was used in a number of formulations to produce various strand-shaped products. A dough mixed according to the formulations shown below was extruded in a Simac PastaMatic pasta extruder through two round openings of 0.14 inch (3.56 mm) diameter. The dough strands were fried either singly (sgl) or side-by-side (dbl) in contact along the entire length as described in Example 1. The dough pieces were cut about 3 inches long and fried at 350° F. for 3 minutes. The results are summarized below.

|  | SAMPLE A | | SAMPLE B | | SAMPLE C | |
|---|---|---|---|---|---|---|
| Ingredients | | | | | | |
| Valley Grain Masa Flour (%) | 100 | | 75 | | 50 | |
| Pregelatinized Corn Flour (%) | 0 | | 25 | | 25 | |
| Amioca Starch (%) | 0 | | 0 | | 25 | |
| Water - % of dry ingredients | 65 | | 65 | | 65 | |
| Shape | sgl | dbl | sgl | dbl | sgl | dbl |
| Good (%) | 0 | 100[a] | 0 | 100 | 0 | 100 |
| Distorted (%) | 100 | 0 | 100 | 0 | 100 | 0 |
| Curved (%) | 79 | 63 | 100 | 82 | 71 | 61 |
| Expansion ratio | 1.09 | 1.14 | 1.10 | 1.28 | 1.21 | 1.33 |
| Increase in exp. (%) | — | 4.80 | — | 16.40 | — | 9.90 |

[a] = many strands separated when placed in the frier and later deformed; 100% of those that adhered together did not deform.

The results of each of the formulations demonstrated the absence of deformation or protuberances when frying a composite dough piece in which the single strands were pressed together into a double strand. Each of the formulations tested expanded differently, but the net increase in products of good shape when frying a double-strand product was clearly demonstrated. The double-strand products were consistently straighter, had a pleasing crunchy texture, and were less hard than the corresponding single strands.

EXAMPLE 4

Single, double and braided strand products were made from conventional corn masa prepared from lime-peeled whole corn.

Corn Chip Masa

A conventional dough used to prepare extruded corn chips was made from a mixture of 60% yellow corn and 40% white corn. The corn was cooked in a hot lime solution in a steam jacketed kettle, soaked for a period of about eight hours, washed to remove the adhering portions of softened hull, and ground through a conventional stone mill, according to well established prior art techniques. Corn chips were prepared from the ground corn by extruding the dough through a Heat and Control vertical piston extruder, forming pieces approximately 1 inch by 1.5 inches in width. The extruded dough pieces dropped directly into a continuous fryer operated at 395° F..

Tortilla Chip Masa

Using the same procedure as above, a masa dough was prepared from 100% white corn. The dough was sheeted and cut into triangular pieces which were baked, equilibrated and fried by standard means for forming tortilla chips.

Preparation of Strand-Like Products

Samples of ground corn prepared as described above were removed from each of the continuous process lines and tested with the PastaMatic extruder. Single strands were extruded through the 0.14-inch opening, collected on a tray, and fried in a batch fryer at 350° F.. The fryer was covered to eliminate the possibility of the frying fat being ejected by the occasional explosion resulting from internal pressure developed within the strands. A second portion of dough was extruded through two openings of the same size situated 0.180 inch apart (center to center) in the extruder die plate. These were placed in contact lengthwise and were cut approximately three inches long. A third sample was extruded through the same two openings, and as the two strands emerged from the extruder they were gently twisted together to form a braid. Because of the twisting together, the adherence of the two strands was noticably more easily accomplished. Similar products were made from the freshly ground tortilla masa. The results of the tests are summarized in the table below.

| Masa Type | Corn Chips | | | | Tortilla Chips | | |
|---|---|---|---|---|---|---|---|
| SAMPLE | A | B | C | D | E | F | G |
| Shape | sgl. | dbl. | braid | std. chip | sgl. | dbl. | braid |
| Expansion | 1.13 | 1.16 | 1.17 | — | 1.13 | 1.21 | 1.16 |
| Inc. Expan. (%) | — | 2.70 | 3.50 | — | — | 7.10 | 2.70 |
| Distorted (%) | 97 | 0 | 0 | — | 97 | 0 | 0 |
| Curved (%) | 100 | 100 | 70 | — | 94 | 100 | 75 |
| Fat content (%) | — | — | 26 | 35 | — | — | 19 |

These results conclusively showed that double-strand or braided elongated snacks could be produced satisfactorily from commercially available corn masa produced from lime-treated whole corn kernels. The fat content of the corn chip braid was 26%, which is significantly lower than the fat content of standard rectangular corn chips made from the same masa (35%). The expansion of all products was low, possibly because the non-uniform structure of the dough permitted water to escape rapidly after the strands were immersed in the hot fat.

EXAMPLE 5

The PastaMatic extruder was used to form a unique twisted or braided corn snack from 500 gm of the following ingredients, in which the corn-based ingredients were nonlime treated.

| Ingredient | Wt % |
|---|---|
| Whole Corn Flour | 45.20 |
| Amioca Starch | 25.00 |
| Corn Flour | 13.50 |
| Pregelatinized Corn Flour | 6.30 |
| Vegetable Oil | 3.08 |
| Sugar | 2.90 |
| Salt | 2.00 |
| Seasoning | 1.42 |
| Lecithin | 0.60 |

The lecithin and oil were pre-mixed with the corn flour for five minutes at speed No. 2 in a 50 quart Hobart mixer with wire whip attachment. The other ingredients were added and mixed for five minutes at speed No. 1, using the paddle for mixing. 300 gm of water were added and mixed three minutes more with a dough hook on speed No. 2 until the mixture formed a noncohesive plastic dough. The dough was allowed to rest for 15 minutes before extrusion, since it had been noted that the stickiness decreased appreciably during this time, probably because of the continued hydration of the relatively large whole corn particles.

The dough was extruded in the PastaMatic through two round openings of 0.14 inch diameter. As the two strands emerged, they were twisted to form a braid, and then cut into pieces 2.5 inches long. The pieces were fried at 350° F. for three minutes. The strands adhered throughout frying to produce an attractive double braid, the design repeating itself approximately four times in each piece. The product had a crisp, crunchy texture and a very desirable appearance.

Some of the strands were fried singly to determine deformation, curving and expansion.

In additional experiments, the moisture content of the dough was reduced (Sample B) and increased (Sample C). The results are summarized below.

| | SAMPLE A | | SAMPLE B | | SAMPLE C | |
|---|---|---|---|---|---|---|
| Water % of dry ingredients | 60.0 | | 45.0 | | 80.0 | |
| Dough moisture (%) | 43.8 | | 38.0 | | 50.0 | |
| Shape | sgl | dbl | sgl | dbl | sgl | dbl |
| Good (%) | 0 | 100 | 100 | 100 | 0 | 100 |
| Distorted (%) | 100 | 0 | 0 | 0 | 100 | 0 |
| Curved (%) | 85 | 64 | 71 | 50 | 100 | 75 |
| Expansion Ratio | 1.17 | 1.36 | 1.22 | 1.26 | 1.22 | 1.27 |
| Increase in exp. (%) | — | 16.20 | — | 3.30 | — | 4.10 |

With the moisture content of the dough at 38%, the dough was so dry that single strands did not deform, or crack or explode; but the finished product was hard and undesirable.

With the moisture content of the dough at 50%, the results were similar to the Sample A, although the finished product was softer with a higher fat content.

EXAMPLE 6

The procedure of Example 5 was repeated with similar ingredients using several die openings to produce single and braided double strands. An additional series of products were made using a 1.7 mm or a 0.81 mm plug inserted into the center of the die to produce a hollowed product. The results are tabulated below.

| | SAMPLE A | | SAMPLE B | | SAMPLE C | | SAMPLE D | |
|---|---|---|---|---|---|---|---|---|
| Die size (mm) | 3.97 | | 3.97 | | 3.81 | | 3.57 | |
| Die post size (mm) | none | | 1.70 | | none | | 0.81 | |
| Shape | sgl | dbl | sgl | dbl | sgl | dbl | sgl | dbl |
| Good (%) | 0 | 100 | 8 | 100 | 0 | 100 | 0 | 100 |
| Distorted (%) | 100 | 0 | 82 | 0 | 100 | 0 | 100 | 0 |
| Curved (%) | 100 | 56 | 98 | 45 | 50 | 38 | 81 | 43 |
| Expansion ratio | 1.19 | 1.30 | 1.10 | 1.14 | 1.12 | 1.28 | 1.18 | 1.33 |
| Increase in exp. (%) | — | 9.20 | — | 3.60 | — | 14.30 | — | 12.70 |

With a 1.7 mm centerpost inserted in the die, 8% of the single strands did not deform. In addition, it was noted that the expansion of both hollowed products of Sample B was less than their counterparts in Sample A because of the reduced internal pressure made possible by the center void.

In the experiment with a 3.57 mm die and a 0.81 mm centerpost (Sample D), the diameter of the centerpost was not large enough to prevent 100% of the single strands from deforming. In addition, the expansion of the products in Sample D was in the normal range.

EXAMPLE 7

The procedure of Example 5 was used to make single and double potato braids from the following ingredients:

| Ingredient | Wt. (%) |
|---|---|
| Potato Starch | 40.4 |
| Potato Granules | 31.3 |
| Corn Flour | 9.7 |
| Potato Flakes | 9.1 |
| Vegetable Oil | 3.2 |
| Whole Corn Flour | 2.0 |
| Pregelatinized Corn Flour | 2.0 |
| Salt | 1.5 |
| Lecithin | 0.4 |

| | SAMPLE A | | SAMPLE B | | SAMPLE C | |
|---|---|---|---|---|---|---|
| Water % of dry ingredients | 81.25 | | 65.00 | | 100.00 | |
| Dough Moisture (%) | 50.00 | | 45.00 | | 55.00 | |
| Shape | sgl | dbl | sgl | dbl | sgl | dbl |
| Good (%) | 0 | 100 | 5 | 100 | 8 | 100 |
| Distorted (%) | 100 | 0 | 95 | 0 | 92 | 0 |
| Curved (%) | 69 | 42 | 72 | 59 | 93 | 46 |
| Expansion Ratio | 1.14 | 1.29 | 1.13 | 1.17 | 1.17 | 1.23 |
| Increase in expansion (%) | — | 13.20 | — | 3.50 | — | 5.10 |

The results were substantially the same as with the corn braid product of Example 3.

EXAMPLE 8

The procedure of Example 6 was followed using the potato dough composition of Example 7, with the following results:

| | SAMPLE A | | SAMPLE B | | SAMPLE C | | SAMPLE D | |
|---|---|---|---|---|---|---|---|---|
| Die size, mm | 3.97 | | 3.97 | | 3.81 | | 3.57 | |
| Die post size, mm | none | | 1.70 | | none | | 0.81 | |
| Shape | sgl | dbl | sgl | dbl | sgl | dbl | sgl | dbl |
| Good (%) | 0 | 100 | 97 | 100 | 2 | 100 | 9 | 100 |
| Distorted (%) | 100 | 0 | 3 | 0 | 98 | 0 | 91 | 0 |
| Curved (%) | 100 | 86 | 100 | 91 | 100 | 98 | 100 | 66 |
| Expansion Ratio | 1.10 | 1.24 | 1.10 | 1.19 | 1.11 | 1.23 | 1.10 | 1.28 |
| Inc. in exp. (%) | — | 12.70 | — | 9.20 | — | 10.80 | — | 16.40 |

Use of the 1.7 mm centerpost practically eliminated deformation and explosion of the single strand product extruded through the 3.97 mm die. The 0.81 mm centerpost was not as effective, although 9% of the single strands did not deform. In both instances, expansion of the products made with the centerpost was less than desired, and in spite of reduced deformation the finished product had a hard, brittle texture. It was concluded that use of the centerpost for a single strand product would be questionable and would not be essential or recommended for the preferred double-strand product.

What is claimed is:

1. A method for preventing distortion of an elongated, thin strand-like expanded fried snack product, the method comprising the steps of:
    preparing a dough from starch-containing cereal solids, potato solids, or mixtures thereof and sufficient water so that the dough contains from about 35% to about 60% moisture by weight of the dough, in which a portion of the starch contained in the dough is gelatinized and in which additional starch contained in the dough is ungelatinized;
    forming said dough into a composite dough piece comprising at least two elongated, thin strand-like dough pieces adhered to one another by point contact along the length of the dough strands; and
    frying said composite dough piece in hot cooking oil and at said 35% to 60% moisture content and with said combination of gelatinized and ungelatinized starches being contained in the dough piece at the time of frying to form a finished fried expanded snack product having a moisture content of about 2% or less, in which the strands of the finished composite product are joined along the point of adherence while maintaining their separate strand-like shape throughout the frying step for substantially reducing distortion of the composite fried snack product when compared with the same dough strand fried singly.

2. The method according to claim 1 in which the adherent dough strands are formed by extrusion and twisting of the extruded dough strands about one another to form a braid.

3. The method according to claim 1 in which the ungelatinized starch is selected from the group consisting of potato, corn and tapioca starch.

4. The method according to claim 1 in which the dough strands are formed by rolling the dough in sheet form, and forming the dough sheet into two adherent strands with a longitudinal knife cut extending partially through the depth of the dough sheet.

5. The method according to claim 1 in which the dough strands are extruded lengthwise through separate extruder die openings.

6. The method according to claim 1 in which the ungelatinized starch is present in the dough either as a constituent of the starch-containing dough solids or is added separately to the dough as raw starch.

7. The method according to claim 1 in which each strand in the composite product expands a greater amount during frying than it does when fried singly.

8. The method according to claim 1 in which the cross section of the dough strand has a major diameter to minor diameter ratio from about 2:1 to about 1:1.

9. The method according to claim 1 in which the composite dough piece is fried at a temperature of about 350° F. for about 2 to 4 minutes.

10. The method according to claim 1 in which the formed dough strands are of generally rounded cross-sectional shape, and the rounded cross-sectional shape of each strand is present in the finished composite fried snack.

11. The method according to claim 1 in which the dough strands expand from about 1.1 to about 1.5 times their original size during the frying step.

12. The method according to claim 1 in which the dough strands are adhered along substantially the entire length of the composite product.

13. The method according to claim 1 in which the starch-containing solids are selected from the group consisting of cooked potato solids; ground precooked corn; cereal flours made from corn, rice, soy, barley, bulgur, oats and rye; or mixtures thereof.

14. A method for preventing distortion of an elongated, thin strand-like expanded fried snack product, the method comprising the steps of:
    preparing a dough from starch-containing cereal solids, potato solids, or mixtures thereof and sufficient water to form a dough containing from about 35% to about 60% moisture by weight of the dough, in which a portion of the starch contained in the dough is gelatinized and in which additional starch contained in the dough is ungelatinized;

forming said dough into a composite dough piece comprising at least two substantially solid, elongated, thin strand-like dough pieces adhered to one another by point contact along the length of the dough strands, the individual dough strands of the composite product having a thickness from about 0.125 to about 0.25 inch; and frying said composite dough piece in hot cooking oil and at said 35% to 60% moisture content and with said combination of gelatinized and ungelatinized starches being contained in the dough piece at the time of frying to form a finished fried expanded snack product having a moisture content of about 2% or less, in which the strands of the finished product are maintained in their separate strand-like shape while becoming integral with one another along their point of adherence for substantially reducing distortion of the composite fried snack when compared with the same dough strand fried singly.

15. The method according to claim 14 in which each strand in the composite product expands a greater amount during frying than it does when fried singly.

16. The method according to claim 14 in which the adherent dough strands are extruded by twisting the strands about one another to form a braid.

17. The method according to claim 14 in which the strands are formed by rolling the dough in sheet form, and forming the dough sheet into two adherent strands with a longitudinal knife cut extending partially through the depth of the dough sheet.

18. The method according to claim 14 in which the two adherent dough strands are extruded lengthwise through separate generally rounded extruder die openings to form strands of generally rounded cross-sectional shape.

19. The method according to claim 14 in which the cross section of each dough strand has a major diameter to minor diameter ratio from about 2:1 to about 1:1.

20. The method according to claim 14 in which the composite dough piece is fried at about 350° F. for about 2 to 4 minutes.

21. The method according to claim 14 in which the dough strands expand from about 1.1 to about 1.5 times their original size during the frying step.

22. The method according to claim 14 in which the dough strands are adhered along substantially the entire length of the composite product.

23. The method according to claim 14 in which the starch-containing solids are selected from the group consisting of cooked potato solids; ground precooked corn; cereal flours made from corn, rice, soy, barley, bulgur, oats and rye; or mixtures thereof.

24. A method for preventing distortion of an elongated, thin strand-like expanded fried snack product, the method comprising the steps of:

preparing a dough from starch-containing cereal solids, potato solids, or mixtures thereof and sufficient water so that the dough contains from about 35% to about 60% moisture by weight of the dough, in which a portion of the starch contained in the dough is gelatinized and in which additional starch contained in the dough is ungelatinized;

forming said dough into a composite dough piece comprising at least two substantially solid, elongated, thin strand-like dough pieces adhered to one another by point contact along substantially the entire length of the dough strands; and frying said composite dough piece in hot cooking oil at said 35 to 60% moisture content and with said combination of gelatinized and ungelatinized starches being contained in the composite dough piece at the time of frying to form a finished fried expanded snack product having a moisture content of about 2% or less, in which the dough strands expand from about 1.1 to about 1.5 times their original size during the frying step, and in which the dough strands are joined along their point of adherence while maintaining their separate strand-like shape throughout the frying step for substantially reducing distortion of the composite product when compared with the same dough strand fried singly.

25. The method according to claim 24 in which the expansion of each strand in the composite piece is greater than the expansion of each strand fried singly.

26. The method according to claim 24 in which the ungelatinized starch is selected from the group consisting of potato, corn, and tapioca starch.

27. The method according to claim 24 in which the dough strands are extruded and twisted about one another to form a braid.

28. The method according to claim 24 in which each strand-like dough piece has a generally rounded cross-sectional shape.

29. The method according to claim 24 in which the individual dough strands of the composite product have a thickness from about 0.125 to about 0.25 inch.

30. The method according to claim 29 in which the starch containing solids are selected from the group consisting of cooked potato solids; ground precooked corn; cereal flours made from corn, rice, soy, barley, bulgur, oats and rye; or mixtures thereof.

31. The method according to claim 30 in which the composite dough piece is fried at about 350° F. for about 2 to 4 minutes.

32. The method according to claim 30 in which the dough strands each have a cross section with a major diameter to minor diameter ratio between 2:1 and 1:1.

* * * * *